Dec. 1, 1964 P. B. ZEIGLER ETAL 3,159,084
HYDRAULIC STEERING SYSTEM
Filed July 25, 1963 3 Sheets-Sheet 1

INVENTORS
Philip B. Zeigler,
Robert P. Rohde,
Marwood M. Frank,
& William B. Thompson
BY
S.C. Thorpe
ATTORNEY Dec. 1, 1964  P. B. ZEIGLER ETAL  3,159,084
HYDRAULIC STEERING SYSTEM
Filed July 25, 1963  3 Sheets-Sheet 2

INVENTORS
Philip B. Zeigler,
Robert P. Rohde,
BY Marwood M. Frank,
& William B. Thompson
S. C. Thorpe
ATTORNEY

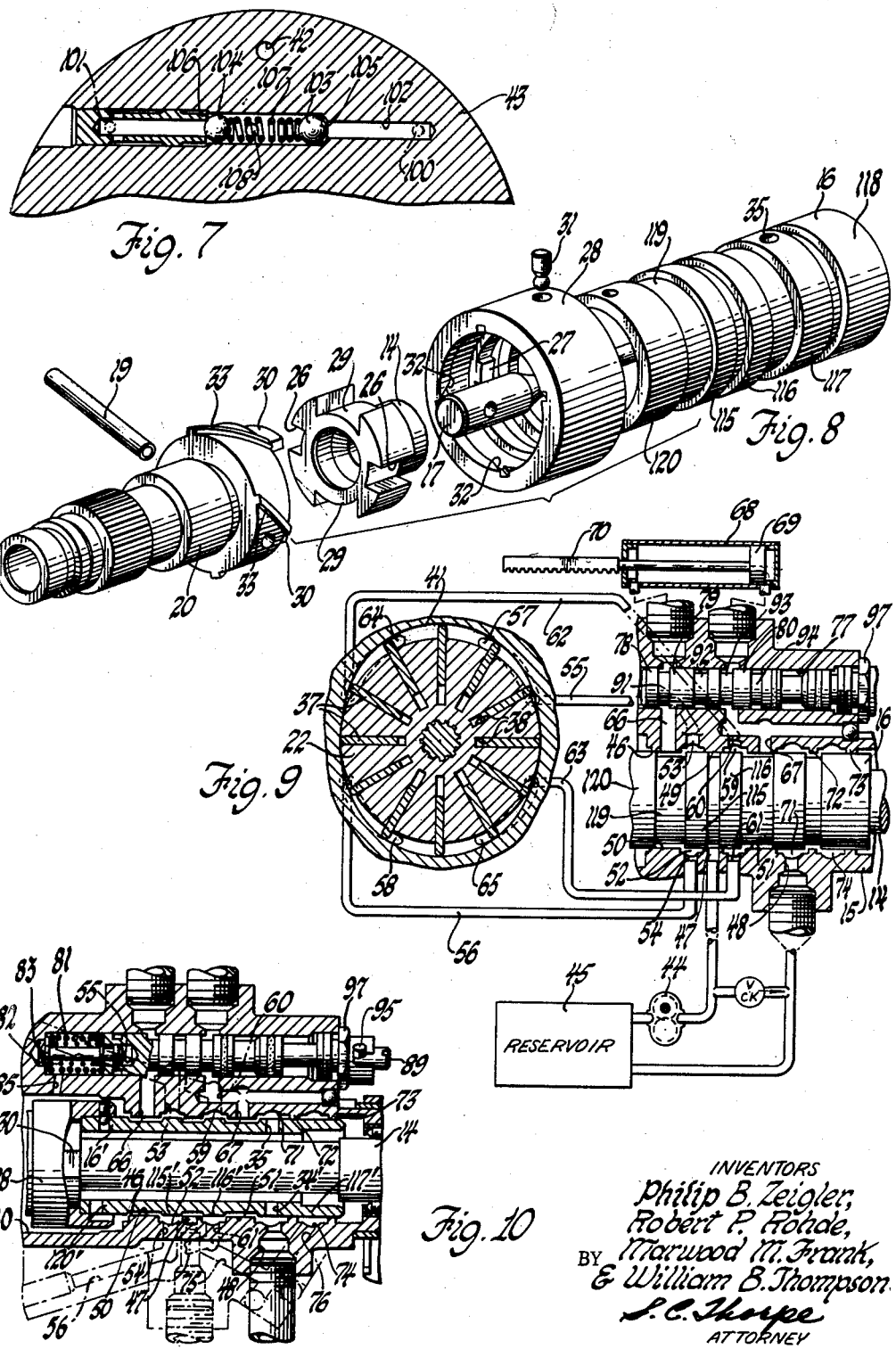

United States Patent Office 3,159,084
Patented Dec. 1, 1964

3,159,084
HYDRAULIC STEERING SYSTEM
Philip B. Zeigler and Robert P. Rohde, Saginaw, Marwood M. Frank, Bridgeport, and William B. Thompson, Frankenmuth, Mich., assignors to General Motors Corporation, Detroit, Mich., a corporation of Delaware
Filed July 25, 1963, Ser. No. 297,556
12 Claims. (Cl. 91—368)

This invention relates to hydraulic steering systems for vehicles, and particularly such systems of the so-called "fully hydraulic" type wherein a hydraulic fluid circuit forms the only actuating connection between the steering wheel or other controlling member and the power cylinder, there being no mechanical connection therebetween, and steering control is effected by a positive displacement device which meters fluid flow in the circuit in accordance with the extent the steering wheel is turned from the centered or straight ahead position.

The present invention provides important improvements over such steering systems heretofore proposed, particularly in so employing control valve means actuatable by the steering wheel to control both the delivery of the hydraulic fluid to the metering device and the delivery of such fluid from the metering device to the power cylinder, and arranging therewith a pressure responsive blocking valve normally operative to prevent flow between the power cylinder and the metering device but automatically openable to accommodate metered flow to the power cylinder when the steering wheel is turned to effect a change in vehicle direction. Means are also provided to selectively retain such blocking valve in its open position so that the vehicle wheels, as in the case of a farm tractor driven between furrows, may be permitted "guide steering" rather than be controlled by the steering wheel.

Also in accordance with the present invention, the control valve is biased to its normally centered position by means of a torsion rod which also rotatively couples the steering wheel shaft to a rotor of the metering device. This torsion rod is elastically yieldable to accommodate rotation of the shaft relative to the rotor, with such shaft rotation being arranged to cause concurrent rotation of the control valve, and rotation of the control valve relative to the rotor being effective to axially shift the control valve from its normally centered position.

Further, the control valve is of the "open center" type, having ports and lands cooperating with ports and lands in a valve chamber to allow circulation of the hydraulic fluid to and from the pump or other pressure source of the system. The arrangement of the ports and lands in the valve chamber is adapted for use with either a form of valve which permits said "guide steering" without it inducing turning of the steering wheel, or with a valve whose ports and lands are so arranged that such "guide steering" is at all times under the positive control of the operator. That is, in the latter case "guide steering" can be prevented by manually restraining the steering wheel from turning.

As a further feature, the control valve, steering input shaft and torsion rod are all arranged concentrically with each other to provide a compact, relatively short linkage between the steering wheel and metering device rotor, and a lost motion connection is provided between the shaft and rotor whereby in the event of loss of external fluid pressure supply the rotor may be manually driven by turning the steering wheel to generate pressure in the power cylinder for steering purposes.

These and other features and advantages of the invention will be more clearly understood from the following description, having reference to the drawings wherein:

FIGURE 1 is a general view of the steering system, showing the control valve, valve chamber and rotary metering device in longitudinal section, with their connections to the input shaft and steering wheel, and also schematically illustrating the pressure supply and power cylinder in circuit with the control valve and metering device. The control valve is shown in this view in its normally centered position for straight-ahead steering of the vehicle (not shown).

Figure 3:
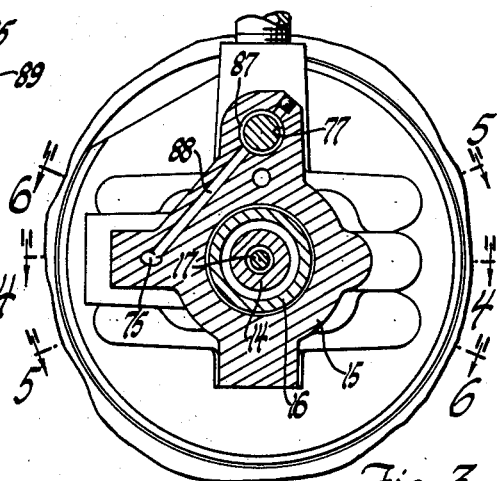
FIGURE 3 is a fragmentary, transverse sectional view taken substantially along the line 3—3 of FIGURE 1.
Figure 4:
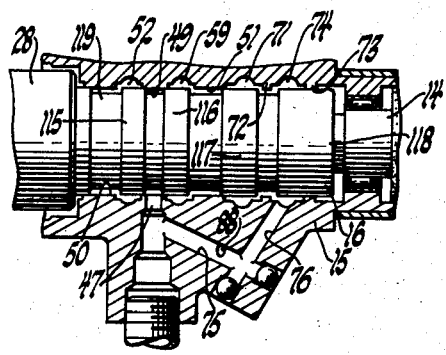
Figure 5:
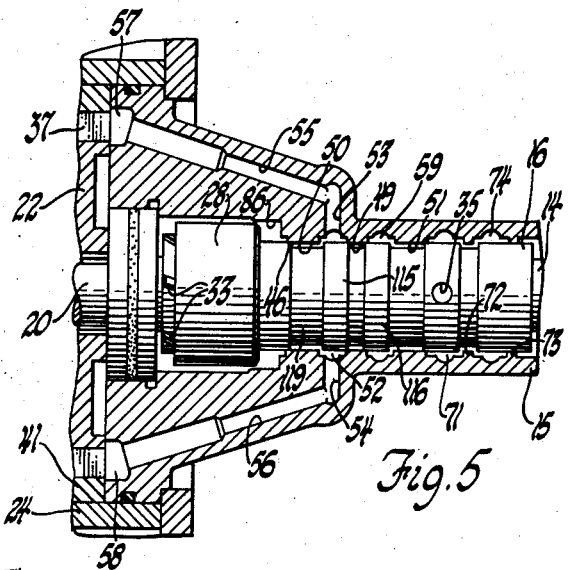
Figure 6:
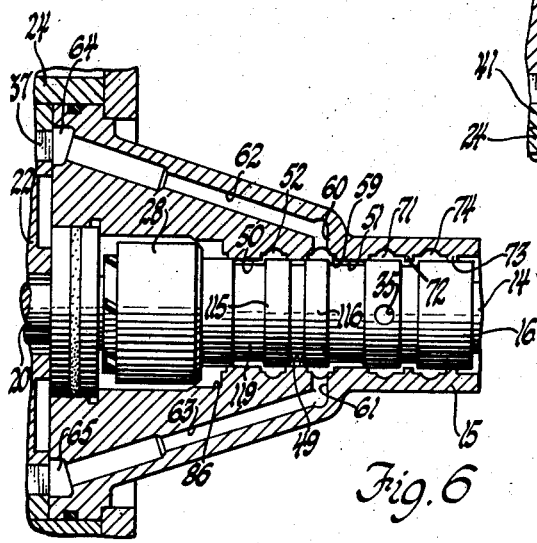

FIGURES 4, 5 and 6 are fragmentary sectional views taken substantially along lines 4—4, 5—5 and 6—6 of FIGURE 3.

Figure 1:
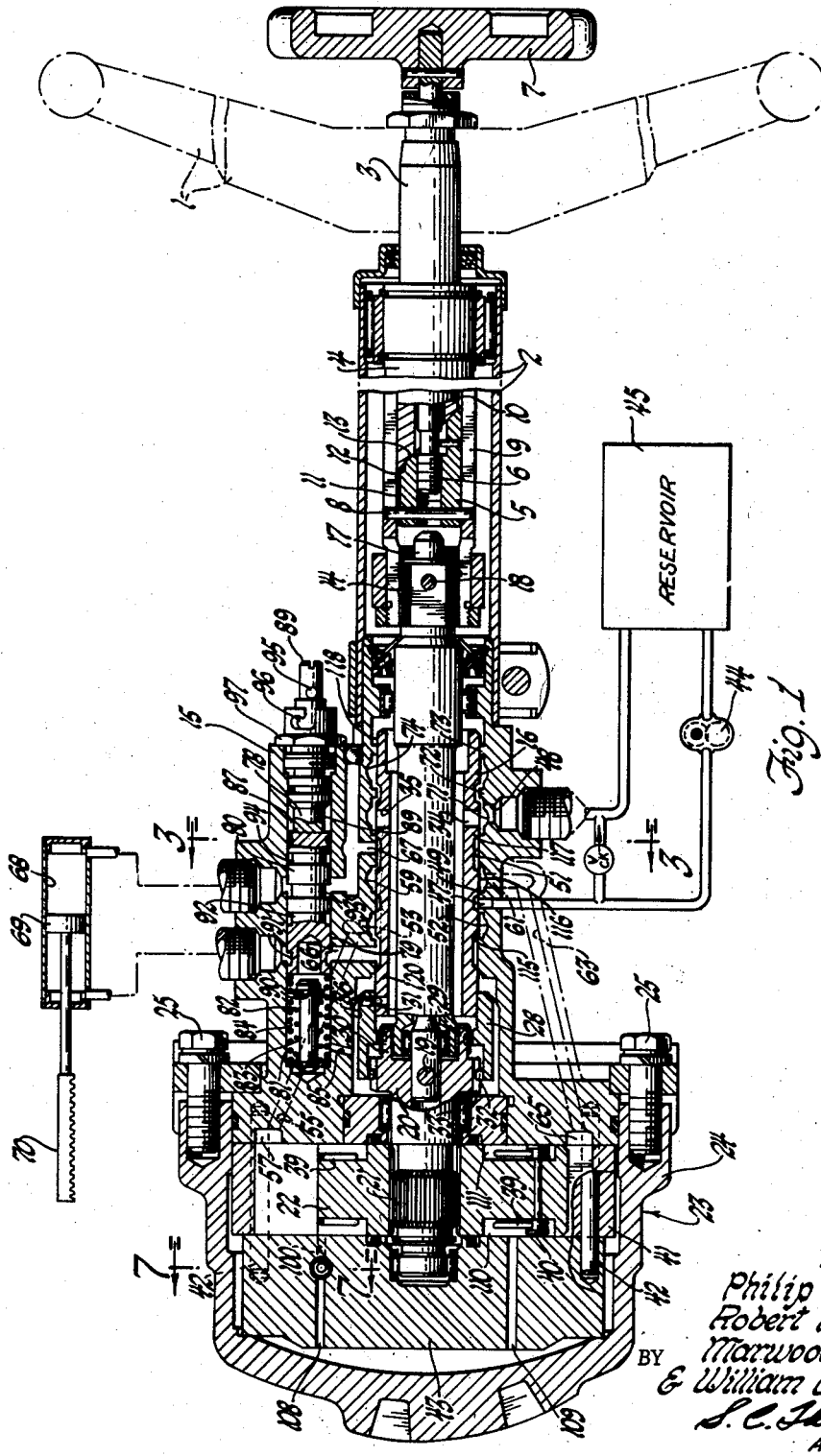

FIGURE 7 is an enlarged fragmentary sectional view taken substantially along the line 7—7 of FIGURE 1, showing the check valving of certain passages in the pressure plate of the metering device.

FIGURE 8 is an enlarged exploded view in perspective of the control valve, torsion rod, rotary drive shaft and a portion of the steering input shaft.

FIGURE 9 is a fragmentary view similar to FIGURE 1, but with the metering device (as viewed from the right in FIGURE 1) and its fluid connections to the control valve chamber illustrated schematically.

FIGURE 10 is a fragmentary view, similar to FIGURE 1, but showing a modified form of the control valve.

Referring now in detail to the drawings and first to FIGURE 1, a steering wheel 1 is shown in phantom at the upper end of a steering mast jacket 2. The upper steering shaft 3 to which the wheel 1 is connected is slidably shiftable longitudinally within an intermediate shaft 4. Longitudinal adjustment of the shaft 3 within the shaft 4 and frictional clamping of the two for concurrent rotation is provided by a wedging nut 5 which can be drawn up tight against the lower end of the upper shaft 3 by a threaded screw 6 extending through the shaft 3 and rotatable by a knob 7 above the steering wheel. The nut 5 has a cross pin 8 extending therethrough and slidable longitudinally of the intermediate shaft 4 along slots 9 in the latter. The nut 5 and upper shaft 3 have lateral clearance as shown at 10 and 11, respectively, enabling their relative shifting movement laterally of each other within the shaft 4 as their wedging surfaces 12 and 13 are caused to slide on each other under the clamping force of the screw 6.

The lower end of the intermediate shaft 4 has a splined engagement with the upper end of the input or lower steering shaft 14 which extends into the housing or valve chamber 15 and concentrically within a sleeve-like control valve 16 therein. This input shaft is hollow, and extending longitudinally therethrough is a torsion rod 17 which is connected at its upper end by a pin 18 for concurrent rotation with the input shaft 14. A pin 19 connects the opposite end of this rod for concurrent rotation with a shaft 20. Splined at 21 to this shaft 20 is the rotor 22 of a rotary metering device indicated generally by the numeral 23. The housing 24 of this metering device is secured by bolts 25 to the lower end of the valve chamber 15.

As best shown in FIGURE 8, the lower end of the input shaft 14 has two diametrically opposed internal splines 26 which slidably receive male splines 27 extending internally of an annular actuator 28, and at right angles to these splines are diametrically opposed slots 29 which loosely receive end projections 30 on the rotor shaft 20. The projections 30 are each of substantially less circumferential extent than that of its respective receiving slot 29, so as to accommodate a certain amount of rotary lost motion between the input shaft 14 and the rotor shaft 20. The internal splines 26, however, closely fit the actuator splines 27 so as to couple the actuator 28 for concurrent rotation with the input shaft 14. This actuator embraces the lower end of the control valve 16, and a dowel pin 31 secures the control valve for rotation with the actuator 28. Helical internal splines 32 are provided within the actuator 28 and slidably receive helical male splines 33 on the rotor shaft 20, whereby relative rotation of the control shaft and rotor shaft results in axial sliding movement of the control valve. Such rotation of the control valve 16 with the actuator 28 and the input shaft 14, within the limits permitted by the lost motion of the exensions 30 in the splines 29, is torsionally resisted by the torsion rod 17. The reaction to such twist of this rod is taken by the rotor 22.

This rotor, as best shown in FIGURE 9, is provided with a plurality of radial vanes 37 which are urged outwardly in their slots 38, both by suitable springs 39 (FIGURE 1) engaging pins 40 and the underside of the vanes, and by fluid pressure acting against the inner ends of the vanes as will be later herein described. Limiting the outward extent of the vanes is a conventional oval-shaped cam ring 41 which is doweled against rotation with the rotor by pins 42 (FIGURE 1) extending longitudinally through the cam ring and terminating at opposite ends in the valve chamber 15 and pressure plate 43.

A source of hydraulic fluid, such as oil, is indicated in FIGURES 1 and 9 in the form of a pump 44 which draws from a reservoir 45 and delivers the fluid to the valve chamber bore 46 at the pressure port 47. Spaced longitudinally of the bore 46 from this pressure port 47 is a return port 48 by which the oil is returned to the reservoir. The pressure port 47 communicates with the bore 46 at a land 49, and on opposite sides of this land are lands 50 and 51. Between the lands 49 and 50 is a groove 52 connecting diametrically opposite ports 53 and 54 which lead via passages 55 and 56 to diametrically opposite cavities 57 and 58 in the valve chamber adjacent the outer ends of the rotor vanes. Similarly, the lands 49 and 51 form between them a groove 59 from which diametrically opposite ports 60 and 61 are connected via lines 62 and 63 with a second pair of pockets 64 and 65 in the valve chamber spaced intermediate the pockets 57 and 58, respectively.

Connecting the valve chamber bore 46, through the land 50 and through the land 51, are respective ports 66 and 67 for delivery and return of the pressure fluid to and from the power cylinder 68. This cylinder has a double acting piston 69 suitably connected to the dirigible wheels of the vehicle (not shown) as by a rack gear 70. The return port 48 to the reservoir 45 connects with the valve chamber bore via a groove 71, and on the opposite side of this groove from the land 51 are a pair of spaced lands 72, 73 which define between them a groove 74. As shown in FIGURE 4, this groove 74 is connected with the pressure port 47 via intersecting drilled passages 75, 76 in the wall of the valve chamber.

Figure 2:
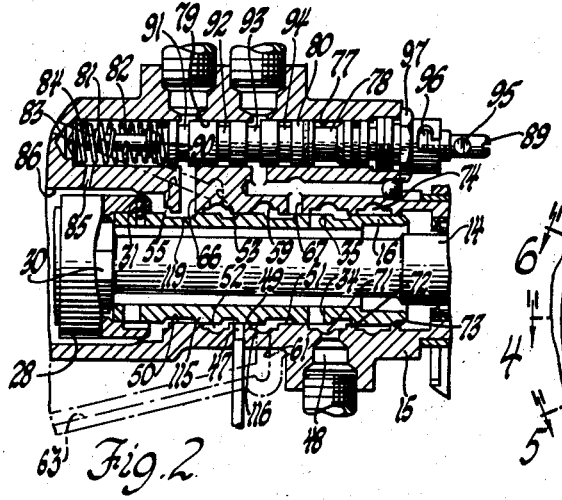
FIGURE 2 is a fragmentary view, similar to FIGURE 1 but showing the control valve displaced from its normally centered position, as during a vehicle turn.

Intersecting both cylinder connected ports 66, 67 in the valve chamber is a bore 77 (FIGURES 1, 2 and 9) in which is slidably fitted a pressure responsive blocking valve 78 adapted to block communication between the cylinder 68 and the valve chamber bore 46. This blocking valve 78 has grooved lands 79 and 80 of sufficient length to block the ports 66 and 67 when the valve is moved a predetermined distance to the left from its position shown. Such leftward movement is resisted by concentric springs 81 and 82, and is limited by the valve 78 moving into abutment against a stop pin 83. The chamber 84 containing the springs at the left end of the valve 78 is vented via a passage 85 to the counterbore 86 in the valve chamber 15 which communicates, via the interior of the sleeve-like control valve 16 and its radial ports 34, 35, with the valve chamber groove 71 and return port 48 to the reservoir. The chamber 87, formed by the bore 77 at the right-hand end of the blocking valve 78, is subjected to supply pressure from the pump by means of a passage 88 (FIGURES 3 and 4) connecting this chamber with the passage 75 and pressure supply port 47. When the pump 44 is not operating and this chamber 87 is thus at substantially atmospheric pressure, the blocking valve 78 is in its extreme rightward position (as shown) against a manually shiftable stop pin 89, being biased thereagainst by the outer spring 81 in the chamber 84. This spring 81 is relatively weak, however, and allows the blocking valve to move from its position shown to that in which the lands 79 and 80 block the ports 66 and 67 in response to a relatively low fluid pressure, say 20 p.s.i., in the chamber 87. At pressures higher than 20 p.s.i. in this chamber 87, the valve 78 will move further to the left, carrying with it the washer 90 on the pin 83 and compressing the inner spring 82. Such leftward movement of the valve to the extent permitted by the stop pin 83 requires a fluid pressure in the chamber 87 of the order of 50 p.s.i. As shown, the land 79 is provided with spaced apart grooves 91 and 92, the former accommodating flow to and from the power cylinder via the port 66 when the pump is not operating, and groove 92 accommodating such flow when the blocking valve is in its extreme leftward position against the stop pin 83. Similarly, the land 80 is provided with spaced grooves 93 and 94 which likewise accommodate flow to and from the power cylinder via the port 67 when the blocking valve is in its respective extreme rightward and leftward positions. The stop pin 89 is manually shiftable inwardly of the bore 77 to locate the blocking valve in its extreme leftward position against the stop pin 83. Suitable means, shown in the form of a lug 95 on the outer end of the pin 89 and a bayonet type slot 96 in the bore closure nut 97, are provided for selectively retaining the blocking valve in such extreme leftward position for open flow communication between the power cylinder and its valve chamber ports 66, 69, when "guide steering" of the vehicle wheels is desired.

FIGURES 5 and 6 show the actual passages 55, 56 and 62, 63 connecting the control valve chamber grooves 52, 59 with the respective pockets 57, 58, 64 and 65 for conducting fluid to and from the rotor 22. In the rotor pressure plate 43 are two drilled passages 100 and 101 (FIGURE 7), extending inwardly thereof from the side facing the rotor, and intersecting the respectively opposite ends of a check valve chamber 102. Within this chamber are two check valves shown in the form of balls 103 and 104 which are normally held against their respective seats 105 and 106 by a coil spring 107. Also intersecting this chamber 102, intermediate the balls 103, 104, is a drilled passage 108 extending oppositely of the passages 100, 101 and communicating with the interior of the housing at the opposite side of the pressure plate from the rotor. A further drilled passage 109 extends entirely through the pressure plate from this end of the housing 24 and communicates with an annular groove 110 in the side of the rotor facing the pressure plate. A like groove 111 is formed on the opposite side or end face of the rotor and communicates with the groove 110 via the vane slots 38 (FIGURE 9). Hence, fluid pressure exists in these slots to urge the vanes outwardly against the cam ring 41 whenever fluid pressure is admitted to the inter-vane spaces at the periphery of the rotor via either the passages 55, 56 or passages 62, 63.

When the control valve 16 is in its centered position shown in FIGURES 1, 4, 5, 6 and 9, and the pump 44 is operating, it will be noted that the valve chamber land 49 overlaps the lands 115 and 116 on the control valve, blocking flow of pump pressure fluid to the rotor via either of the grooves 52 and 59. Communication does exist, however, between the cylinder port 66 and the groove 52, and between the cylinder port 67 and the groove 59. Also, circulation through the valve chamber from the pressure to the return sides of the pump 44 is accommodated by reason that the lands 117 and 118 of the control valve are spaced to allow flow around the valve chamber land 72 between the grooves 71 and 74 which connect with the return port 48 and the auxiliary pressure port 76, respectively. An "open center" effect is thus obtained with this control valve whereby the pressure pump 44 is not required to operate against any excessive back pressure during periods when the control valve is in centered position. In such centered position of the valve, its land 117 overlaps the right-hand end of the valve chamber land 51 to block communication of both the rotor ports 60, 61 and cylinder port 67 with either the return port 48 or the auxiliary pressure port 76. With the pressure pump 44 operating, there is sufficient pressure drop through the valve chamber bore 46 that the necessary fluid pressure (say 20 p.s.i.) exists in the chamber 87 to urge the blocking valve 78 a sufficient distance leftward from its position shown that its lands 79, 80 close off the cylinder ports 66, 67 against the relatively weak spring 81.

In operation, to effect a vehicle turn, say to the right, the steering wheel 1 is manually turned in that direction, with the result that the hollow input shaft 14, actuator 28 and the control valve 16 are all correspondingly rotated in the same direction. The rotor 22, in resisting such rotation, causes the torsion rod 17 to twist and transmit such resistance back through the steering wheel to the operator in the form of "feel." To the extent relative rotation occurs between the actuator 28 and the rotor 22, the helical splines 32, 33 effect axial shifting of the actuator and the control valve in the leftward direction to their positions shown in FIGURE 2. High pressure oil is thereby allowed to flow from the pressure port 47 into the groove 52 and thence via the ports 53, 54, passages 55, 56, to the pockets 57, 58 of the rotor. At the same time, the control valve land 118 having moved into overlapping relation with land 72 of the valve chamber, supply pressure in groove 74 and passages 76 and 88 and chamber 87 builds up to move the blocking valve 78 to the left, such that its grooves 92 and 94 accommodate flow through the power cylinder ports 66 and 67. This high pressure fluid also acting on the outer ends of the rotor vanes 37 causes the rotor to rotate in a clockwise direction as viewed in FIGURE 9, to the extent the steering wheel and the input shaft 14 and actuator were rotated from their normally centered position. A metered amount of fluid under pressure is thus delivered by the rotor to the pockets 64, 65, from which it is returned to the valve chamber groove 61, for flow therefrom via the cylinder port 67 to the right-hand end of the power cylinder 68. As the power cylinder piston 69 moves leftward in response to this fluid pressure, the fluid therein to the left of the piston 69 returns via the cylinder port 66 to the control valve groove 119 which is then open to the valve chamber counterbore 86 and (via the interior of the control valve and its ports 34, 35) groove 71 to the reservoir return port 48.

During a left turn, the helical splines act oppositely to move the control valve to the right from its centered position of FIGURES 1, 4, 5, 6 and 9, allowing pressure from the port 47 to enter the groove 59 and rotate the rotor in a conuterclockwise direction as viewed in FIGURE 9. The metered quantity of fluid returning from the rotor to the groove 52 is permitted to enter the cylinder via port 66 and flow to the left-hand end of the power cylinder since the blocking valve grooves 92 and 94 will be in position to accommodate such flow as during the previously described right turn.

Such rotation of the control valve relative to the rotor to effect such a vehicle turn is accommodated by the freedom for rotary lost motion between the actuator splines 29 and the rotor shaft projections 30 (FIGURE 8), and by torsional windup of the torsion rod 17. As the rotor rotates in the course of making the vehicle turn, the helical splines 32, 33 effect the return of the control valve 16 back to its centered position in the valve chamber in response to the biasing action of the torsion rod, again restoring the bypass of pressure fluid between the auxiliary pressure port (passage 76, FIGURE 4) and the reservoir return port 48. This also results in relieving the high fluid pressure in the blocking valve chamber 87, allowing the inner spring 82 to return the blocking valve to the position in which its lands 79, 80 again close off the power cylinder ports 66, 67 from communication with the power cylinder 68. Thus with each change in steered direction of the vehicle, the power cylinder piston 69 (and hence the vehicle wheels, not shown) is positively set and hydraulically locked against inducing any feedback of force to the steering wheel as the result of the vehicle wheels striking an obstruction.

In the event the pressure supply pump 44 should fail, it is still possible to steer the vehicle by manually rotating the rotor 22 after taking up the lost motion between the rotor shaft projections 30 and the input shaft splines 29. Whether during such manual rotation of the rotor in the manner of a manual pump, or with the pump 44 supplying fluid under pressure to the inter-vane spaces of the rotor, the fluid pressure in these inter-vane spaces is utilized to assist the vane springs 39 in biasing them outwardly against the cam ring. Depending on the direction of rotor rotation, this fluid pressure enters the check valve chamber 102 (FIGURE 7) in the pressure plate 43 via either the drilled passage 100, or the drilled passage 101, displaces one of the check valve balls 103, 104 from its seat to allow the fluid pressure to reach the inner ends of the vane slots via the pressure plate passages 108 and 109.

In the event it is desired to permit "guide steering" of the vehicle wheels, the blocking valve 78 is locked in its extreme leftward position against the stop pin 83 by engaging the lug 95 in the bayonet slot 96 (FIGURE 1). This maintains open communication both between the left-hand end of the power cylinder 68 and the rotor fluid pockets 57, 58 in the valve chamber, and between the right-hand end of the power cylinder and the rotor fluid pockets 64, 65. So long as the control valve 16 remains in its centered position, however, no fluid flow between the power cylinder and the metering device can occur, since the control valve lands 120 and 117 block fluid flow from the cylinder ports 66 and 67 to the return port 48, and the valve chamber land 49 blocks flow between the valve chamber grooves 52 and 59. However, with no manual restraint placed on the steering wheel to prevent its rotating, should one of the vehicle's dirigible wheels be deflected the resultant hydraulic pressure developed in one end of the power cylinder will effect rotation of the rotor in the corresponding direction to establish circulation of fluid between the valve chamber grooves 52, 59. That such will occur will be seen from the fact that fluid returning from the power cylinder to either the port 66 or 67 will correspondingly apply fluid pressure in either the pockets 57, 58, or the pockets 64, 65 to rotate the rotor and thereby return fluid therefrom to the groove 52 or 59, depending on the direction of turn. Such rotation of the rotor will, in turn, be transmitted by the torsion shaft to the input shaft 14, intermediate shaft 5, upper shaft 3 and the steering wheel 1.

With the control valve 16 described, however, such "guide steering" is subject at all times to control by the operator. That is, by manually restraining the steering wheel from rotating during vehicle operation with the blocking valve locked out (i.e. lug 95 in bayonet slot 96), any rotation of the rotor relative to the actuator 28 will effect an axial movement of the control valve 16 in the direction to open the pressure port 47 to either the valve chamber groove 52 or the valve chamber groove 59 (depending on the direction of such relative rotation). Fluid pressure, being then admitted to the rotor chamber pockets 57, 58 or pockets 64, 65 will act in opposition to such rotation of the rotor in resisting the fluid force transmitted thereto from the power cylinder.

FIGURE 10 shows an alternative construction of the control valve which enables such "guide steering" to occur without corresponding rotation of the steering wheel. In other words, in accordance with this modification, such "guide steering" is accommodated with the control valve held in its centered positions, yet the operator is enabled to overrule the "guide steering" effect by rotating the steering wheel in the direction he wishes the vehicle to be directed. This is accomplished in accordance with FIGURE 10 by use of a control valve 16' which has its lands 115' and 116' spaced from each other so as not to overlap the valve chamber land 49 when in centered position. Also, this valve has a single land 117' extending the full length of the previously described lands 117 and 118 of the control valve 16. In the centered position of the valve 16', however, this land 117' and the land 120' at the opposite end of the valve do not overlap the valve chamber lands 51, 50, respectively, so that an "open center" condition for flow of fluid from the pressure port 47 in each direction through the bore 46 of the valve chamber is permitted. Also with this valve 16' installed in the valve chamber 15, the auxiliary pressure port provided by the passage 76 is continuously maintained closed by the land 117'.

In operation using this control valve 16', the "open center" condition described enables "guide steering" without effecting any axial movement of the control valve and resultant rotation of the steering wheel. Should such "guide steering," say in a leftward direction, be desired to be overruled by the operator, and the vehicle thus maintained on its original course, however, the operator by turning the steering wheel to the right will effect an axial movement of the control valve 16' to the left as viewed in FIGURE 10. Such obviously results in the land 116' closing off fluid pressure delivery to the rotor port 61 while continuing to accommodate fluid pressure delivery to the rotor port 53. This difference in fluid pressure, reflected in the pockets 57, 58, 64 and 65, will result in counterclockwise (FIGURE 9) rotation of the rotor and consequent delivery of increased fluid pressure to the power cylinder port 67 and the right-hand end of the power cylinder 68, to oppose such leftward "guide steering" of the vehicle wheels.

It will be appreciated from inspection of the drawings, both with respect to the first described control valve 16 and the modified form thereof, that turning movement of the steering wheel in the opposite direction from those described will have correspondingly opposite effects in controlling the action of the power cylinder through the metering device 23.

Also, it will be appreciated that minor changes in the parts and their arrangement from those described may be made without departing from the spirit and scope of the invention as set forth in the following claims.

We claim:

1. Power steering apparatus comprising a fluid circuit including a source of pressure fluid, a power cylinder actuatable by said fluid, a device for metering flow of said fluid to the cylinder, and a valve for controlling fluid flow between said source and device, and means for operating said valve, said device including a positive fluid displacement member movable by said valve operating means.

2. The invention of claim 1 wherein said valve operating means includes a manually operable shaft, and including an elastic element mechanically interposed between said shaft and member to bias return movement of the valve after said member has completed its fluid metering movement.

3. The invention of claim 1, together with a valve chamber for said valve having valve controlled passages interconnecting said device and cylinder, whereby metering of fluid to the cylinder is subject to operation of the valve.

4. The invention of claim 1, together with a pressure responsive valve in said circuit between said device and cylinder, and means biasing said pressure responsive valve to a position blocking return flow of fluid from the cylinder, said pressure responsive valve being movable against said biasing means to a position accommodating said return flow of fluid in response to a predetermined pressure of the fluid in the circuit between said device and pressure responsive valve.

5. Power steering apparatus comprising a source of fluid pressure, a power cylinder, a fluid circuit connecting said source and cylinder, a rotatable and slidably openable control valve and a rotary fluid metering device in said circuit, said device having a rotor rotatable to meter pressure fluid to the cylinder in response to fluid pressure developed in the circuit between said device and control valve as the result of opening the control valve, and means for opening the control valve including a manually rotatable input shaft, slidable spline means rotatably coupling the control valve to the shaft for concurrent rotation but accommodating slidable movement of the control valve relative to the shaft, helical spline means connecting the control valve and rotor for effecting said sliding movement of the control valve in response to relative rotation of the rotor and control valve, and a torsion rod rotatably coupling said rotor to the shaft and yieldably opposing their relative action.

6. The invention of claim 5, wherein said control valve is generally sleeve-shaped, said shaft is tubular and extends longitudinally through the control valve, said torsion rod extends longitudinally through the shaft, and wherein said rod has its end remote from the rotor connected to the shaft for rotation therewith and said slidable spline means is located adjacent the rotor end of the rod, whereby torsional flexure of the rod accompanying relative rotation of the rotor and control valve occurs within the shaft.

7. The invention of claim 6, together with a connection between said shaft and rotor for rotating the rotor in either direction by rotating the shaft in said direction, said connection having rotary lost motion accommodating relative rotation of the shaft and rotor, said lost motion being limited to that required to effect opening of the control valve from its closed position.

8. The invention of claim 4, together with means for releasably securing said pressure responsive valve in said flow accommodating position.

9. The invention of claim 8, wherein said circuit includes a valve chamber for said control valve, said chamber having a pair of pressure and return ports connected to said source, a pair of pressure and return ports connected to said device and a pair of pressure and return ports connected to said cylinder, said chamber having lands intermediate said ports and said control valve having cooperating lands operative in closed position of said control valve to block said pressure port while accommodating fluid flow between said device connected pressure port and said cylinder connected return port and between said device connected return port and said cylinder pressure return port, and operative upon opening said control valve to accommodate fluid flow between said source and device connected pressure ports and between said source and cylinder connected return ports, and to block fluid flow between said device connected pressure port and said cylinder return port while continuing to accommodate fluid flow between said device connected return port and said cylinder connected pressure port, whereby with said pressure responsive valve secured in said flow accommodating position any tendency of said cylinder to rotatively drive said rotor while said shaft is restrained from rotating and said control valve is closed results in relative rotation of said rotor and shaft and consequent opening movement of the control valve to admit pressure fluid to said device connected pressure port in opposition to said tendency.

10. The invention of claim 9, wherein said valve chamber is further provided with a second pressure port connected to said source and an additional land, said additional land being located to accommodate fluid flow between said second pressure port and said source connected return port when said control valve is in closed position and to cooperate with one of said control valve lands to block said last named flow when the control valve is in open position, whereby pressure fluid circulation to and from said source is maintained via said chamber when said control valve is closed.

11. The invention of claim 5, wherein said control valve is slidably operable in each direction from a neutral closed position and said circuit includes a valve chamber having spaced ports controlled by sliding movements of said control valve, said ports including pressure and return ports connected to said source, a pair of ports connected to said metering device and a pair of ports connected to said cylinder, each of said control valve and chamber having spaced lands cooperating when said control valve is in said neutral position to block fluid flow between said pressure port and each of the other of said ports but accommodating flow between one of said cylinder ports and one of said device ports and between the other of said cylinder ports and the other of said device ports, said lands being operable upon movement through a predetermined distance of said control valve in either direction from said neutral position to accommodate flow between said pressure port and a respective device port and between a respective cylinder port and said return port, and to block flow between said respective device port and said respective cylinder port while continuing flow accommodation between the other of said device ports and the other of said cylinder ports, said chamber having a second pressure port connected to said source, said lands cooperating when said control valve is in neutral position to accommodate fluid flow between said second pressure port and said return port and to block flow between said second pressure port and each of the other of said ports, but operable upon movement through said predetermined distance of said control valve to block flow between said second pressure port and each of the others of said ports, whereby when said control valve is in neutral position pressure fluid circulation to and from said source is maintained but rotation of said rotor and consequent movement of said control valve from its said neutral position must accompany operation of said cylinder.

12. The invention of claim 8, wherein said circuit includes a valve chamber for said control valve, said chamber having a pair of pressure and return ports connected to said source, a pair of pressure and return ports connected to said device and a pair of pressure and return ports connected to said cylinder, said chamber having lands intermediate said ports and said control valve having cooperating lands accommodating fluid flow from said source connected pressure port to each of the other of said ports in one position of said control valve, and operative upon movement of the control valve in either direction from said one position to block said flow respectively to one each of said device and cylinder connected ports while continuing to accommodate said flow to the others of said ports, whereby with said pressure responsive valve secured in said flow accommodating position and the control valve in said one position any tendency of said cylinder to rotatively drive said rotor is accommodated by free flow of fluid between said cylinder and device connected ports, but may be restrained by rotation of said shaft in the direction opposite to the rotation of the rotor induced by fluid pressure from the cylinder to effect movement of the control valve from said one position to a position directing fluid under pressure to the rotor in opposition to its said induced rotation.

No references cited.